Sept. 10, 1940. J. J. MIZER Re. 21,560
LIFTING MECHANISM
Original Filed Aug. 5. 1939
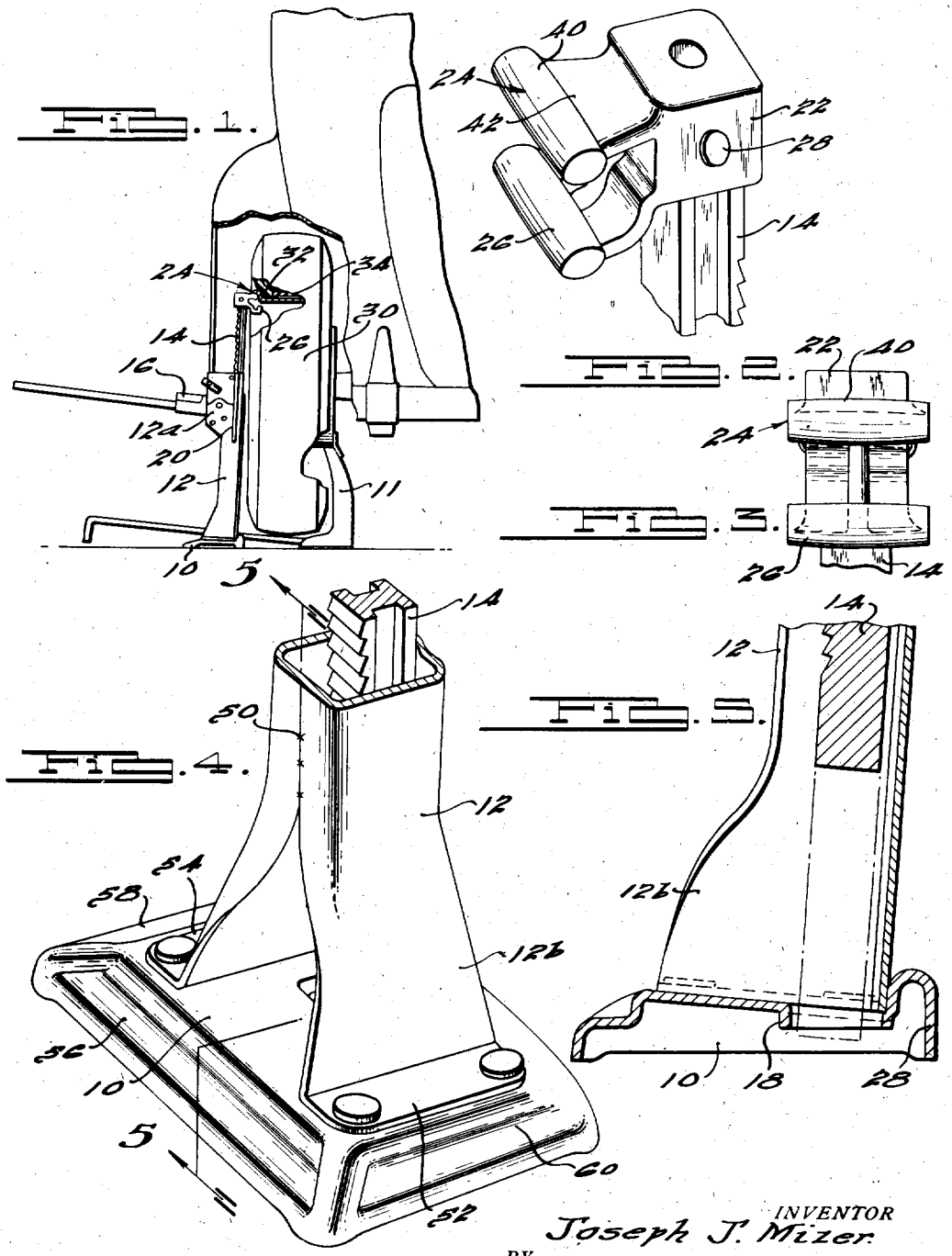
INVENTOR
Joseph J. Mizer.
BY
Harness, Dickey & Pierce.
ATTORNEYS.

Reissued Sept. 10, 1940 Re. 21,560

UNITED STATES PATENT OFFICE 21,560

LIFTING MECHANISM

Joseph J. Mizer, Racine, Wis., assignor to Walker Manufacturing Company of Wisconsin, a corporation of Wisconsin Original No. 2,179,948, dated November 14, 1939, Serial No. 288,550, August 5, 1939. Application for reissue April 12, 1940, Serial No. 329,358

7 Claims. (Cl. 254—133)

The present invention relates to lifting devices, and is particularly directed to a structure embodying improvements on the lifting mechanism described and claimed in applicant's copending application Serial No. 264,355, filed March 27, 1939, now Patent No. 2,168,489, granted August 8, 1939.

Principal objects of the present invention are to provide a lifting device of the above generally indicated type, embodying an improved construction of lifting head and an improved base structure for the jack element; to provide such construction wherein the lifting head is formed to afford a secure and reliable engagement with a projecting wheel part, such as the rim thereof; to provide such a construction wherein the lifting head embodies a plurality of spaced wheel engaging elements, to accommodate the structure to wheels of different heights; and to provide such an arrangement embodying an improved reinforced base structure.

With the above as well as other objects in view, which appear in the following description and in the appended claims, a preferred but illustrative embodiment is shown in the accompanying drawing, throughout the several views of which corresponding reference characters are used to designate corresponding parts and in which:

Figure 1 is a view in side elevation of the improved lifting device in operative position;

Figure 2 is a detailed view in perspective of the improved lifting head;

Figure 3 is a view in front elevation of the improved lifting head;

Figure 4 is a fragmentary view in perspective of the improved jack base structure; and Figure 5 is a view in section, taken along the line 5—5 of Figure 4.

As is described in the above identified copending application, lifting devices of the type to which the present invention particularly relates comprise generally a jack member adapted to be applied to an exposed part of the vehicle wheel so as to lift the same, and a holding member, adapted to be positioned below an unsprung part of the vehicle so as to hold the previously raised wheel in elevated position. After the holding member is positioned beneath the unsprung part, the jack member may be removed from the wheel, thereby enabling the replacement of the tire, the wheel or both. The present invention is particularly concerned with improvements in the construction of the jack member itself.

Referring to the several figures, the improved jack member comprises generally a base member 10, from which a housing 12 extends upwardly at a fixed but slight inclination thereto. The housing 12 accommodates a usual lifting column 14, illustrated as being of the rack type, and the upper portion 14a of the housing 14 is arranged in any suitable manner to accommodate the usual actuating mechanism, associated with the column 14. A usual handle element 16 is provided, which may be raised and lowered in the usual fashion, so as to raise or lower the column 14 relative to the housing 12. The housing 12 is of greater transverse width than the column 14 as clearly appears in Figure 5, but guiding support for the column 14 is afforded by the guide opening defined by the marginal edge 18 in the base 10, and by striking in ways 20 from the respectively opposite side of the upper portion of the housing 12, as appears in Figure 1. The lower end of the column 14 engages in the opening when the jack is lowered, and grooves in the sides of the column engage over the ways throughout the travel of the column. Thus, the actuating mechanism 12a causes the column 14 to raise and lower along a line parallel to the inclination of the housing 12.

At its upper end, the lifting column 14 is provided a head 22, having the two wheel engaging lugs 24 and 26. The head 22 comprises a generally rectangular body portion, adapted to fit down over the upper end of the column 14, and is secured in place thereon in any suitable manner as by one or more rivets such as 28, passed transversely therethrough, so as to form a rigid connection between these two members.

In the practical operation of the device, and as described in the above identified copending application, a lifting operation is effected by positioning the base 28 of the jack immediately adjacent the base of the vehicle wheel, such as the wheel 30 of Figure 1. With the base thus positioned, the inclination toward the wheel of the housing 12 and the column 14 is just sufficient to bring, for normal operation, the lifting lug 24 beneath the outwardly and upwardly curved portion 32 of the rim structure 34 associated with the wheel 30. The just mentioned curved portion 32, as viewed in an axial section through the wheel, is of only limited extent as will be appreciated and also, it may be expected that in practice, in certain instances at least, the lifting movement will involve a small amount of sliding of the rim portion 32 about the lifting lug 24 as a bearing. The normal jack raising or lowering operations comprise simply a vertical reciprocation of the handle 16 but it will be appreciated that during such movements a tendency may develop to swing the handle in such a direction as to rock the column 14 to a limited extent about its own axis.

Bearing the above as well as other considerations in view, the lifting lug 24 of the present structure comprises an elongated rounded body portion 40, the rim engaging portion whereof extends upwardly somewhat from the general plane of the connecting portion 42. The generally rounded form of the body portion 40 adapts it to fit closely within the rounded portion 32 of the rim, the curvature of the rounded portion being such as to enable it to seat within the portion 32 much as a bearing element seats within a cooperating bearing. The elongated form of the body portion 40 enables it to directly engage the rim portion 32 over a substantial length circumferentially of the rim, so as to minimize the tendency of the previously described rocking movement of the handle from unseating it. In order to enable the rounded portion to directly engage all parts of the just mentioned circumferential section, the upper surface of the body portion 40, as viewed in a plane parallel to the plane of rotation of the wheel, is of arcuate form, as clearly appears in Figure 3. The radius on which the arcuate portion of the body 40 is struck is, as will be appreciated, based upon the radius of the associated rim. It will be appreciated that the inwardly and upwardly directed body portion 40, rounded both in a plane parallel to an axial section through the rim and in a plane parallel to the plane of rotation of the rim, securely seats beneath the rounded portion 32 of the rim, and produces a very firm engagement between the rim and the jack.

Under normal circumstances, all lifting operations are effected by placing the lug 24 beneath the rim portion 32 as previously described. In such normal lifting movement the rim 30 carries a tire, which, even in flattened condition, raises the rim structure somewhat above the level of the roadway. In order to shorten the overall length of the jack as much as possible, it is desirable to so proportion it that when the lug 24 initially engages under the rim portion 32, the column 14 is withdrawn substantially to its lowermost position. With these considerations in view, it will be appreciated that in the event it becomes necessary to lift a rim, not provided with a tire, it is desirable to provide the jack structure with a supplemental lifting lug. In the present instance this feature is afforded by providing the head 22 with the additional lug 26, which is positioned immediately below and in slightly forwardly offset relation to the upper lug 24. The form of the lug 26 of course corresponds in all respects to the form of the lug 24, and it will be appreciated that the vertical spacing between the lugs 24 and 26 is such that when the lower lug 26 is positioned beneath the cooperating portion 32 of the rim, the upper lug 24 clears the upper edge of the rim.

An important feature of the present construction resides in the construction of the lower part of the housing 12 and the construction of the base. Referring particularly to Figures 4 and 5, it will be noticed that the housing 12 is of generally box-like form, formed, by suitable die forming operations, from an initially plane sheet of stock, with the meeting edges of the stock secured together as by welding at a plurality of points therealong such as 50. In order to laterally widen the housing 12, and enable it to better withstand the severe strain which is placed upon it when a vehicle is rolled off the jack, without lowering the latter, the lower portion 12b of the housing 12 is relatively widely flared. The connection between the housing 12 and the base 10 is effected by providing the lower end of the housing with the laterally turned flanges 52 and 54, which seat upon and are secured as by riveting to the upper surface of the base 10. The base 10 is of generally downwardly presenting cup-like form, and maximum strength is imparted thereto by forming the ribs 56, 58, 60 and 28 along the marginal edges thereof. The rib 28 is of particular importance, since it will be appreciated that when the vehicle is rolled off the jack, the principal strain on the base is applied along the portion thereof adjacent the wheel. The rib 28 respectively reinforces the base for this service, while, at the same time, permitting the base of the housing 12 to be positioned immediately adjacent the front face of the base. Additional reinforcing of the base is afforded by forming the previously mentioned flange 18 around the guide opening for the lifting column 14.

It will be appreciated from the foregoing that the present invention provides an extremely simple and effective lifting device, and that although only one specific embodiment of the invention has been described in detail, various modifications in the form, number and arrangement of parts may be resorted to within the spirit and scope of the invention.

What is claimed is:

1. In a lifting device for a vehicle wheel, said wheel having a rim portion projecting therefrom which is outwardly and upwardly curved in a plane transverse to the plane of rotation of the wheel, said device having a base adapted to rest upon a supporting surface and a substantially linear column carried by the base and extending inclinedly upwardly therefrom at a fixed angle thereto, the combination of a head carried by the column at the top of the column, said head having a lifting lug projecting laterally therefrom in the direction toward which said column is inclined, said lug being of elongated, generally rounded form, the curvature of the lug in a plane transverse to the length thereof being proportioned in accordance with the aforesaid curvature of said rim portion, and the upper surface of the lug being arched on a radius approximately equal to the radius of the vehicle rim.

2. In a lifting device for a vehicle wheel, said wheel having a rim portion projecting therefrom which is outwardly and upwardly curved in a plane transverse to the plane of rotation of the wheel, said device having a base adapted to rest upon a supporting surface and a substantially linear column carried by the base and extending inclinedly upwardly therefrom at a fixed angle thereto, the combination of a head carried by the column at the top of the column, said head comprising a pair of immediately adjacent vertically spaced rim engaging lugs, each said lug extending laterally from the column in the direction in which the column is inclined, each said lug having a body portion of elongated, rounded form, the curvature of the body in a plane transverse to the length thereof being proportioned in accordance with the aforesaid curvature of said portion, the vertical spacing between said lugs being proportioned so that when the lower lug is engaged with the said rim portion the upper lug extends over the top of the rim.

3. In a lifting device for a vehicle wheel, said wheel having a rim portion projecting therefrom which is outwardly and upwardly curved in a plane transverse to the plane of rotation of the wheel, said device having a base adapted to rest upon a supporting surface and a substantially linear column carried by the base and extending inclinedly upwardly therefrom at a fixed angle thereto, the combination of a head carried by the column at the top of the column, said head comprising a pair of immediately adjacent vertically spaced rim engaging lugs, each said lug extending laterally from the column in the direction in which the column is inclined, each said lug having a body portion of elongated, rounded form, the curvature of the body in a plane transverse to the length thereof being proportioned in accordance with the aforesaid curvature of said portion, the vertical spacing between said lugs being proportioned so that when the lower lug is engaged with the said rim portion, the upper lug extends over the top of the associated rim, and said lower lug being offset from the column a greater distance than the upper lug.

4. In a jack of the class described, the combination of a base structure, a housing member secured to and extending upwardly and forwardly from the base structure at a fixed inclination thereto, said housing being adapted to accommodate a lifting column, said housing being flared adjacent the base in a plane at right angles to the plane of said inclination, said base being of downwardly presenting cup-like form, said housing being secured to said base at a point spaced rearwardly from the front edge of the base, and said base having a reinforcing rib struck from the base portion thereof and positioned between the housing and said front edge.

5. In a jack of the class described, the combination of a base structure, a housing member secured to and extending upwardly and forwardly from the base structure at a fixed inclination thereto, said housing being adapted to accommodate a lifting column, said housing being flared adjacent the base in a plane at right angles to the plane of said inclination, said base being of downwardly presenting cup-like form, said housing being secured to said base at a point spaced rearwardly from the front edge of the base, and said base having a reinforcing rib struck from the base portion thereof and positioned between the housing and said front edge, said base having an opening in the body thereof through which said column is adapted to project when in lowered position, and said opening having a reinforcing flange extending therearound to reinforce the base structure.

6. In a lifting device for a vehicle wheel, said wheel having a portion projecting outwardly therefrom which is curved in a plane including the axis of the wheel, said device having a base adapted to rest upon a supporting surface and a substantially linear column carried by the base and extending upwardly therefrom, the combination of a head carried by the column, said head having a lifting lug projecting laterally therefrom but positioned immediately adjacent the axis of the column, said lug being of elongated, generally rounded form, the curvature of the lug in a plane transverse to the length thereof being proportioned in accordance with the curvature of said portion, and the upper surface of the lug being convexly arched to fit said portion.

7. In a lifting device for a vehicle wheel, said wheel having a portion projecting outwardly therefrom which is curved in a plane including the axis of the wheel, said device having a base adapted to rest upon a supporting surface and a substantially linear column carried by the base and extending upwardly therefrom, the combination of a head carried by the column, said head comprising a pair of immediately adjacent vertically spaced lifting lugs, each lug extending laterally from the column but positioned immediately adjacent the axis of the column, each said lug having a body portion of elongated, rounded form, the curvature of the body in a plane transverse to the length thereof being proportioned in accordance with the curvature of said portion, the vertical spacing between said lugs being proportioned so that when the lower lug is engaged with the said portion the upper lug extends over the top of said portion.

JOSEPH J. MIZER.